(No Model.)
B. M. PEARNE.
TRICYCLE.
No. 368,607. Patented Aug. 23, 1887.
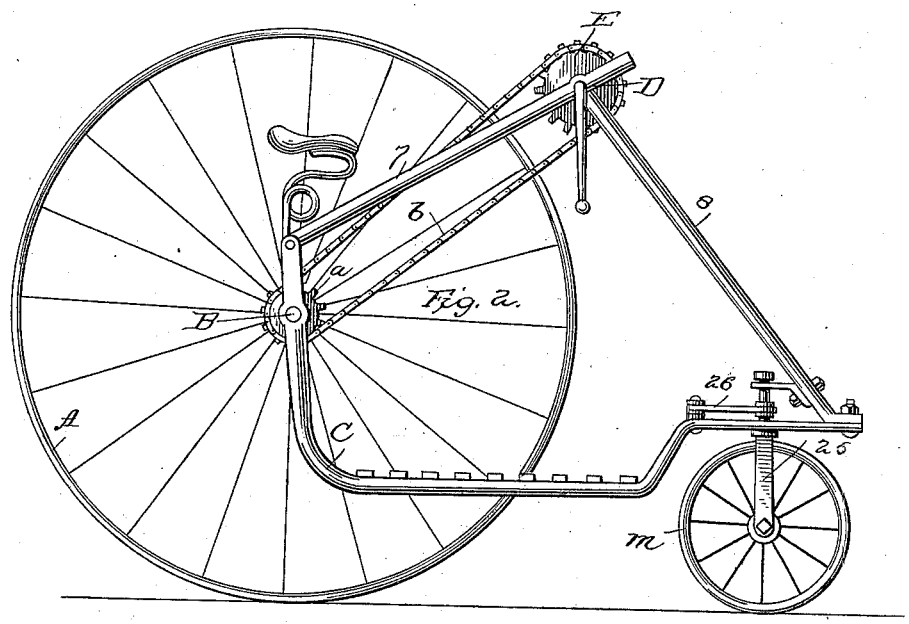
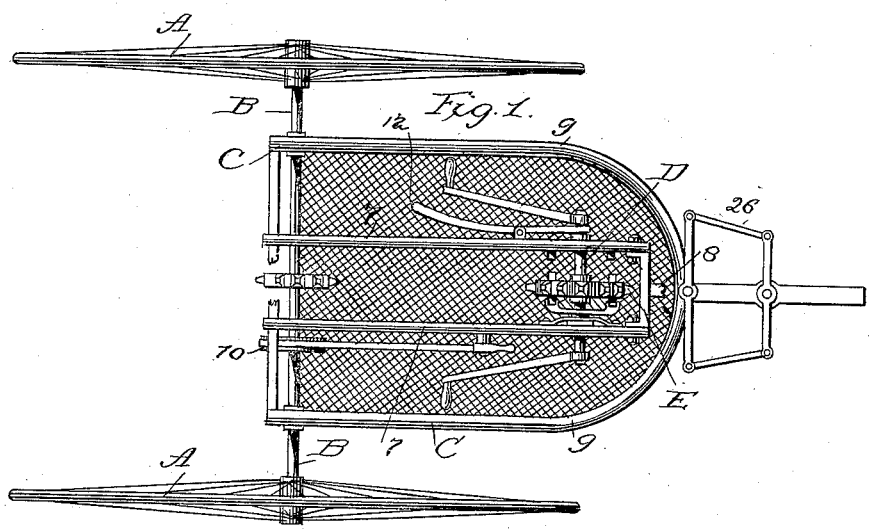
Attest:
Walter Donaldson
Frank L. Middleton
Inventor
Benj M. Pearne
by Ellis Spear
Atty.

(No Model.)  2 Sheets—Sheet 2.
B. M. PEARNE.
TRICYCLE.
No. 368,607.  Patented Aug. 23, 1887.
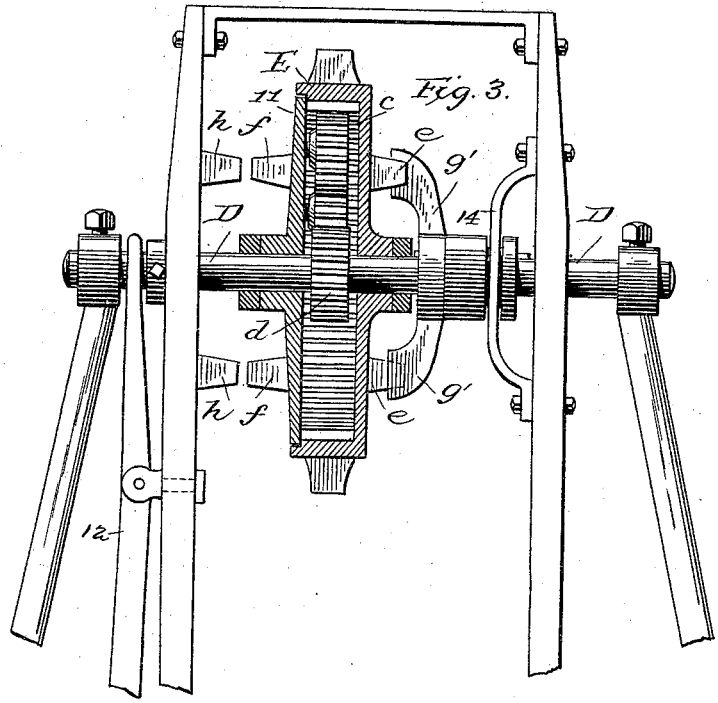
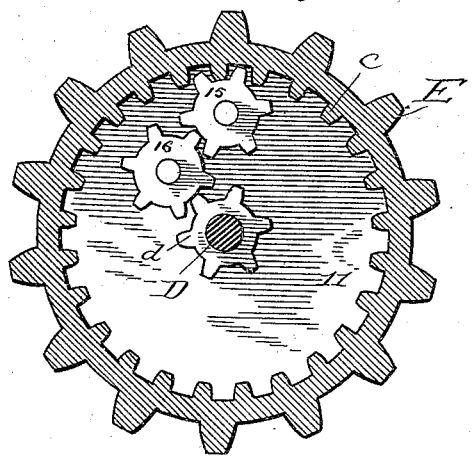
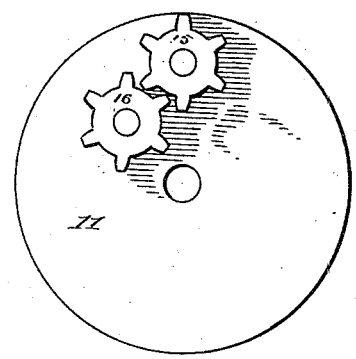

UNITED STATES PATENT OFFICE.

BENJAMIN M. PEARNE, OF OXFORD, NEW YORK.

TRICYCLE.

SPECIFICATION forming part of Letters Patent No. 368,607, dated August 23, 1887.

Application filed December 9, 1886. Serial No. 221,123. (No model.)

*To all whom it may concern:*

Be it known that I, BENJAMIN M. PEARNE, of Oxford, in the county of Chenango and State of New York, have invented a new and useful Improvement in Tricycles; and I do hereby declare that the following is a full, clear, and exact description of the same.

My invention relates to tricycles, and has for its object the production of a machine adapted to be driven by hand-cranks, and through mechanism designed to communicate the motion from the driving-power to the axle to a greater or less degree, whereby the machine is adapted to be propelled upon either level ground or up an incline.

My invention consists in the employment of hand-cranks in combination with driving mechanism between said cranks and the axle of the machine, and in the novel and peculiar form of said driving mechanism, whereby the movement of the hand-crank may be imparted to the axle to its full extent, if desired, or in the case of uphill work the same movement of the said hand crank may effect only a partial rotation of the driving mechanism, and consequently propel the machine at a slower rate of speed, the decrease in motion being compensated for by the increase in leverage.

My invention consists, further, in the details of construction and the peculiar arrangement of the parts, all of which will be fully described hereinafter, and particularly pointed out in the claims.

In the drawings, Figure 1 is a plan view of the machine with the seat removed. Fig. 2 is a side elevation of the same. Fig. 3 is a sectional view along the driving-shaft, showing the sprocket-wheel and the internal gear mechanism carried thereby. Fig. 4 is a detail view of the sprocket-wheel. Fig. 5 is a detail view.

In the drawings the main driving and supporting wheels are shown at A A and the axle at B.

C represents the supporting-frame of the machine, which may be composed of tubular metal or wooden bars formed into the shape shown. The arms $g$ $g$ of said frame are connected to the axle at their rear ends. In the forward end of the frame a small guiding and supporting wheel, $m$, is journaled, and mechanism, which will be hereinafter particularly described, is also carried by this portion of the frame for the purpose of operating and controlling said guiding-wheel. The seat is supported upon a spring, which in turn is held by a suitable standard extending vertically from the frame above the axle.

I aim to provide a machine which may be driven by hand, and with this object in view a driving-shaft is supported directly in front of the seat, being placed so that the crank-arms carried thereby will be in convenient position to be grasped and operated by hand. This shaft is shown at D, and is supported in proper position by the two pairs of braces 7 and 8, the former extending from the standard upon the axle and the latter being fixed to the forward end of the main frame. The crank-arms are fixed to the shafts outside of the braces. Upon the axle of the machine a sprocket-wheel, $a$, is fixed, and motion is imparted to this wheel through the chain $b$ and large sprocket-wheel E, carried by the driving-axle. The differential driving mechanism designed to change the speed of the machine and the leverage of the driving-shaft is now to be described.

The sprocket-wheel E is supported between collars in a fixed relation in regard to the driving-shaft; but it is permitted rotary movement independently of that of the said shaft. Clutches or clutch-pins $e$ $f$ are provided upon either side of the sprocket-wheel, which are adapted to engage separately with corresponding clutches $g'$ $h$, situated upon either side of the supporting-frame. The driving-axle is journaled so as to have longitudinal sliding movement in its bearings for the purpose of throwing either the right or the left hand side of the sprocket into mesh with its corresponding clutch, as desired. This sliding movement of the axle D is effected by means of a hand-lever, 12, pivoted upon the supporting-frame at 13, and engaging with the axle at a point outside the supporting-brace, as shown. If desired, however, the crank-arms may themselves be employed to give the shaft the required longitudinal movement. The clutch $g'$ upon the frame to the right of the sprocket-wheel is designed to give the said wheel a movement equal to that of the shaft when said wheel and clutch are in engagement, and for this purpose the clutch is splined to the shaft, so as to make the same number of revolutions therewith. It is held against longitudinal movement by the arms or collar 14, secured to the frame, engaging with a peripheral groove formed in the clutch, so that the longitudinal movement of the shaft will not affect its fixed relation to the frame.

It will be seen that when the clutch-pins $e$ upon the sprocket-wheel are thrown into the path of the clutch $g'$, referred to, one revolution of the shaft will, through said clutch, impart a like motion to the sprocket-wheel, which, through the chain $b$ and wheel $a$, effects the propulsion of the machine. When it is desired to propel the machine uphill, the sprocket-wheel is shifted to the left-hand side of the frame, and the clutches on this side engaging cause the parts to be actuated to a degree less than the imparting movement of the hand-cranks, the sprocket being revolved once to about three and a half revolutions of the hand-cranks. When the parts are in this position, the leverage of the driving-axle is also increased. The mechanism for effecting these desirable ends consists in the following combination of parts: The sprocket-wheel is provided upon its interior periphery with gear-teeth, as at $c$, and it is through these that the motion of the shaft is communicated to the wheel when the shaft is shifted to the left. A face-plate, 11, is carried upon the left side of the sprocket, and upon the inner side of this plate are journaled pinions 15 16, the former meshing with the internal gear of the sprocket-wheel and the latter with the small driving-gear $d$, fixed to the shaft. The face-plate also is provided with the clutch-pins $f$, before referred to, which are adapted to engage with the clutch $h$ upon the left of the frame. The manner of supporting the face-plate to the sprocket is such that when the parts are in the position referred to, at the extreme left-hand limit of their movement, the face-plate will be held by the clutch-pins against rotary movement, while the revolution of the sprocket-wheel will not be interfered with. The motion of the shaft will thus be imparted to the sprocket-wheel at a decreased rate through the small gear $d$ and pinions, and one revolution of the shaft will effect only a partial rotation of the sprocket-wheel. The pinions act as separate levers and the power is multiplied by their employment. When the sprocket-wheel is in engagement with the right-hand clutch, the face-plate and all the parts revolve in unison.

The forward supporting and guiding wheel is journaled in an upright arm, 25, which has its bearings in the frame of the machine and in an arm projecting from the brace 8. Rotary movement is permitted this standard, and in order to operate and control the wheel, the pivoted frame 26 is provided, supported by the frame and attached to the upper portion of the arm 25. This frame is conveniently positioned to be actuated by the feet of the rider. Between the sides $g$ $g$ of the frame a strong wire-netting, or a grating of any suitable material, is placed, which is designed to act as the floor of the machine, and may be employed for carrying bundles and parcels, or this may answer as a foot-rest. By thus operating the driving mechanism by the hand-cranks and supporting said mechanism above the frame of the machine I am enabled to provide the floor or body composed of the netting or grating as described above. Any suitable brake mechanism, such as shown in Fig. 1 at 10, may be employed.

Having thus described my invention, what I claim is—

1. In combination, the main driving-shaft arranged to have sliding movement, the supporting-frame for said shaft, the sprocket-wheel carried by said shaft and adapted to have rotary movement independent of the same, the clutches $g$ $h$, held to the supporting-frame, the clutch-pins $e$ $f$, arranged upon the sprocket-wheel, and the gear mechanism, substantially as described, whereby the rotary movement of the driving-shaft is imparted to the sprocket-wheel to a greater or less degree, according as the sprocket-wheel be in engagement with the right or left hand clutch, all substantially as described.

2. In combination, the sliding shaft D, the single sprocket-wheel carried thereby, the clutches upon either side of said sprocket-wheel for giving the sprocket-wheel a differential movement, and the hand-cranks whereby the shaft may be rotated and shifted from side to side, substantially as described.

3. In combination, the sliding shaft carrying loosely the sprocket-wheel, the pinion fixed to the shaft, the face-plate supported by the sprocket-wheel, substantially as described, the clutch-pins and pinions carried by said face-plate, the internal gear upon the sprocket-wheel, and the clutch-pins $h$ upon the main frame, substantially as described.

4. In combination, a main driving-shaft, D, a sprocket-wheel, E, carried thereby, a supporting-frame for the shaft, means for shifting the sprocket-wheel E from side to side, means, substantially as described, carried by the shaft, for engaging directly with the sprocket-wheel when in one position, whereby the movement of the shaft will be imparted directly and fully to the sprocket, a gear-wheel, and intermediate mechanism for actuating said sprocket-wheel when in the opposite position, whereby the movement of the shaft will be indirectly imparted to the sprocket and at a decreased rate, all substantially as described.

5. In combination, the main driving-shaft arranged to slide longitudinally in its bearings, the supporting-frame for said shaft, the sprocket-wheel mounted upon said shaft so as to have the same sliding movement as the shaft, but rotary movement independent thereof, a clutch splined to the shaft upon one side of the sprocket-wheel and held to the frame, said clutch being adapted to engage directly with the sprocket-wheel when the shaft is in one position, a gear-wheel fixed to the shaft, intermediate mechanism between said gear and the sprocket-wheel, and clutch mechanism upon the other side of the sprocket, adapted to throw the said mechanism into action when the shaft is shifted to its other position, all substantially as described.

6. In combination, the main driving and supporting wheels, the main supporting-frame extending approximately horizontally to the front and supporting the guiding-wheel at its forward end, and the wire-netting between the sides $g\ g$, substantially as described.

7. In combination, the axle B, the side rods, $g\ g$, having the axle-bearings, said rods extending downwardly from the axle and to the front, the driving-shaft D, adapted to be driven by hand, the sprocket E, the braces 7, extending from a point over the axle to the driving-shaft, the brace 8, extending from the front of the frame $c$ to the driving-axle, and the seat supported over the axle, all substantially as described.

In testimony whereof I have signed my name to this specification in the presence of two subscribing witnesses.

BENJ. M. PEARNE.

Witnesses:
WM. M. MILLER,
JARED C. ESTELOW.